United States Patent
Kim et al.

(10) Patent No.: US 9,052,006 B1
(45) Date of Patent: Jun. 9, 2015

(54) CONTROLLING METHOD AND SYSTEM FOR REDUCING TIP-IN SHOCK

(71) Applicant: Hyundai Motor Company, Seoul (KR)

(72) Inventors: Ki Chang Kim, Seoul (KR); Kil Young Youn, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/461,870

(22) Filed: Aug. 18, 2014

(30) Foreign Application Priority Data

Dec. 13, 2013 (KR) .................. 10-2013-0155488

(51) Int. Cl.
| | | |
|---|---|---|
| *B60W 10/06* | (2006.01) | |
| *B60W 10/08* | (2006.01) | |
| *B60W 10/18* | (2012.01) | |
| *F16H 57/00* | (2012.01) | |
| *F16H 61/02* | (2006.01) | |
| *B60W 10/184* | (2012.01) | |

(52) U.S. Cl.
CPC ........ *F16H 57/0006* (2013.01); *F16H 61/0202* (2013.01); *B60W 10/184* (2013.01); *B60W 10/06* (2013.01); *B60W 10/08* (2013.01)

(58) Field of Classification Search
CPC ... B60W 10/06; B60W 10/08; B60W 10/184; B60W 20/00; B60W 2510/06; B60W 2510/08
USPC .......................................................... 701/53
See application file for complete search history.

(56) References Cited

U.S. PATENT DOCUMENTS

| | | | | |
|---|---|---|---|---|
| 7,816,874 | B2 * | 10/2010 | Matsuzaki et al. | 318/139 |
| 8,249,783 | B2 * | 8/2012 | Ishikawa et al. | 701/51 |
| 2008/0090696 | A1 | 4/2008 | Okubo et al. | |
| 2008/0153660 | A1 * | 6/2008 | Uejima et al. | 477/3 |
| 2011/0029172 | A1 * | 2/2011 | Kwon et al. | 701/22 |
| 2011/0112709 | A1 * | 5/2011 | Park et al. | 701/22 |

FOREIGN PATENT DOCUMENTS

| | | |
|---|---|---|
| JP | 2008-248928 A | 10/2008 |
| KR | 10-2010-0022555 A | 3/2010 |
| KR | 2011-0012160 A | 2/2011 |
| KR | 2013-0036744 A | 4/2013 |

OTHER PUBLICATIONS

Korean Office Action dated Dec. 23, 2014 in corresponding Korean Patent Application No. 10-2013-0155488.

* cited by examiner

*Primary Examiner* — Edwin A Young
(74) *Attorney, Agent, or Firm* — McDermott Will & Emery LLP

(57) ABSTRACT

A control method and system for reducing tip-in shock includes fixing a wheel with a wheel brake of a vehicle when an engine of the vehicle starts. A motor position sensor value is detected when a motor connected to the wheel through a plurality of gears is operated forward by a forward torque and a motor position sensor value when the motor is operated backward by a backward torque, by applying the forward torque and the backward torque to the motor with the wheel being fixed. An entire backlash generated between the plurality of gears is calculated on the basis of the motor position sensor values. A driving current for driving the motor is applied to the motor in accordance with the calculated entire backlash.

9 Claims, 2 Drawing Sheets

A : without reduction of tip-in shock

B : vehicle with small entire backlash – small Δt

C : vehicle with large entire backlash – large Δt

CONTROLLING METHOD AND SYSTEM FOR REDUCING TIP-IN SHOCK

CROSS-REFERENCE(S) TO RELATED APPLICATION

The present application claims the benefit of priority to Korean Patent Application Number 10-2013-0155488 filed on Dec. 13, 2013, the entire contents of which application is incorporated herein for all purposes by this reference.

TECHNICAL FIELD

The present disclosure relates to a control method and system for reducing tip-in shock, and more particularly, to a control method and system for reducing tip-in shock, which can reduce the tip-in shock on the basis of an entire backlash that is measured every time an engine starts.

BACKGROUND

Fuel cell and hybrid vehicles can travel in an electric vehicle (EV) traveling mode implemented by a driving motor that converts electrical energy from a high-voltage battery into mechanical energy. The mechanical energy generated when an engine operates and wheels rotate is returned through the driving motor and converted into the electrical energy by an inverter, so as to charge the battery.

Torque from the driving motor is transmitted through a plurality of gears and a drive shaft, and a backlash may be generated due to tolerance between the gears while the torque is transmitted. Since the backlash due to the tolerance between the gears are accumulated, shock (tip-in shock) is generated between the gears when a driver presses down an acceleration pedal (in tip-in), and accordingly, vibration is generated and deteriorates driving ability.

In order to reduce the tip-in shock, a motor controller, a fuel cell controller, or a hybrid controller controls a driving current for driving the driving motor in tip-in, such that the driving current increases slowly. However, as the driving current increases slowly, an acceleration response of the vehicles decreases.

The description provided above as a related art of the present disclosure is just for helping in understanding the background of the present disclosure and should not be construed as being included in the related art known by those skilled in the art.

SUMMARY OF THE DISCLOSURE

The present disclosure provides a control method and system for reducing tip-in shock which can measure a magnitude of an entire backlash generated in a driving system of a vehicle and control a driving current for driving a driving motor on the basis of the magnitude.

According to an exemplary embodiment of the present disclosure, a control method for reducing tip-in shock includes fixing a wheel with a wheel brake of a vehicle when an engine of the vehicle starts. A motor position sensor value is detected when a motor connected to the wheel through a plurality of gears is operated forward by a forward torque and when the motor is operated backward by a backward torque, by applying the forward torque and the backward torque to the motor with the wheel being fixed. An entire backlash generated between the plurality of gears is calculated on the basis of the motor position sensor values. A driving current for driving the motor is applied to the motor in accordance with the calculated entire backlash.

The step of calculating may calculate a difference between the motor position sensor value when the motor operates forward and the motor position sensor value when the motor operates backward.

The step of applying the driving current may be performed after a delay time corresponding to a magnitude of the calculated entire backlash.

The delay time corresponding to the magnitude of the calculated entire backlash may be extracted from a map that is mapped with an interrelation.

The method may further include a step of applying a torque to remove the calculated entire backlash to the motor for the delay time.

The forward torque may be a D-gear creep torque and the backward torque may be an R-gear creep torque.

The step of applying the driving current may be performed after the delay time, when a backlash is generated while the vehicle travels.

According to another aspect of the present disclosure, a control system for reducing tip-in shock includes a motor that is connected to a wheel through a plurality of gears and includes a resolver sensing a position. A motor controller is configured to control driving of the motor by applying a current to the motor, apply a forward torque and a backward torque to the motor, and receive a motor position sensor value when the motor is operated forward by the forward torque sensed by the resolver and a motor position sensor value when the motor is operated backward by the backward torque, from the resolver. A vehicle controller is configured to fix the wheel when an engine of a vehicle starts, receive the motor position sensor values from the motor controller, calculate an entire backlash generated between the plurality of gears on the basis of the motor position sensor values, and control the motor controller to drive the motor in accordance with the calculated entire backlash.

According to the control method and system for reducing tip-in shock of an embodiment of the present disclosure, it is possible to measure the magnitude of backlashes that depend on the gears that may expand/contract in accordance with the change of the seasons, thus uniformly and optimally reducing the tip-in shock regardless of the change of the seasons.

Further, the magnitudes of backlashes may be different in accordance with part tolerance and assembly tolerance even in the same kind of vehicles. However, it is possible to minimize the tip-in shock and ensure an acceleration response by performing a reduction control of the tip-in shock which is optimized for each vehicle.

Further, even if the magnitudes of the backlashes are changed by wear of the gears, it is possible to measure the magnitudes of the entire backlash every time the engine starts without using a fixed tip-in shock reduction technology, thus optimally reducing the tip-in shock regardless of a distance covered in a given time of the manufacturing year of the vehicles.

Further, the magnitudes of the backlashes may change when there is a problem with a torque transmission system, that is, a motor, a reduction gear, a drive shaft, and a brake. However, it is possible to find out whether there is a problem with the parts by measuring the backlashes before starting the engine, and accordingly it is possible to preclude an accident while the vehicle travels.

BRIEF DESCRIPTION OF THE DRAWINGS

The above and other features of the present disclosure will now be described in detail with reference to certain exemplary embodiments thereof illustrating the accompanying drawings which are given herein below by way of illustration only, and thus are not limitative of the present disclosure.

Figure 1:
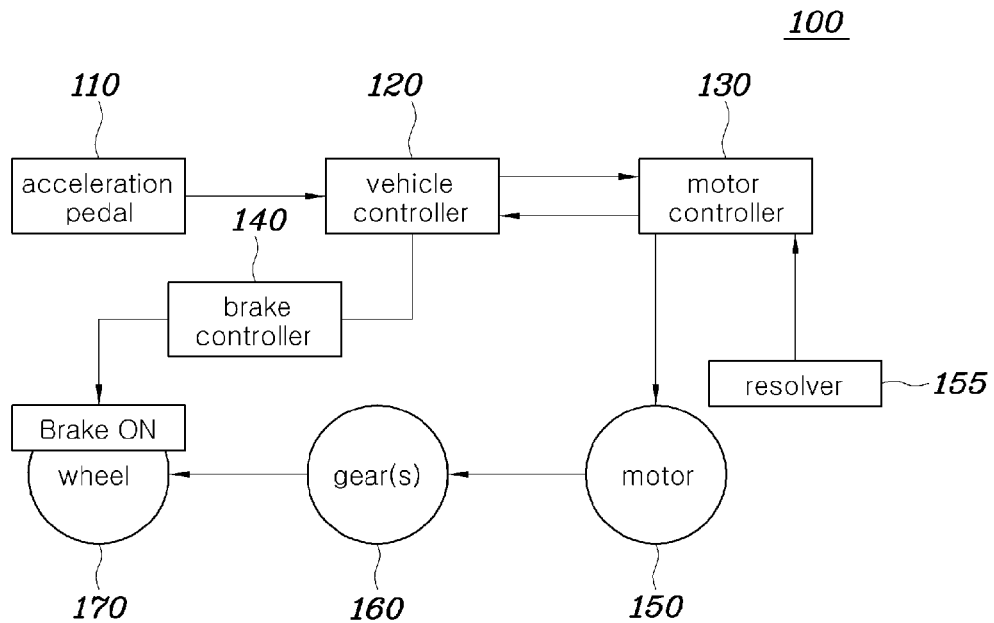
FIG. 1 is a block diagram illustrating a control system for reducing tip-in shock according to an embodiment of the present disclosure.

It should be understood that the appended drawings are not necessarily to scale, presenting a somewhat simplified representation of various preferred features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Specific structural and functional descriptions of embodiments of the present disclosure provided in this specification or application are exemplified for the purpose of explaining embodiments according to the present disclosure, and the embodiments of the present disclosure may be implemented in various ways and should not be construed as being limited to the embodiments provided in this specification or application.

Embodiments of the present disclosure may be changed and modified in various ways, so that specific embodiments are shown in the drawings as examples and will be described in detail in this specification or application. However, it is to be understood that embodiments according to spirit of the present disclosure are not limited to the specific embodiments, but include all modifications, equivalents, and substitutions included in the spirit and the scope of the present disclosure.

Terms including "first" and/or "second" may be used to describe various components, but the components are not limited to the terms. The terms are used to distinguish one component from another component, and for instance, a first component may be referred to as a second component, and similarly, a second component may be referred to as a first component without being depart from the scope according to the spirit of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing the relationships of components, that is, "between" and "directly between", or "close to" and "directly close to" should be understood in the same way.

Terms used herein are used only in order to describe specific embodiments rather than limiting the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meaning as those that are understood by those who skilled in the art. It should be understood that the terms defined by the dictionary are identical with the meanings within the context of the related art, and they should not be ideally or excessively formally defined unless the context clearly dictates otherwise in this specification.

The present disclosure is described hereafter in detail by describing preferred embodiments of the present disclosure with reference to the accompanying drawings. Like reference numerals given in the drawings indicate like components.

FIG. 1 is a block diagram illustrating a control system for reducing tip-in shock according to an embodiment of the present disclosure. Referring to FIG. 1, a control system 100 for reducing tip-in shock may include an acceleration pedal 110, a vehicle controller 120, a motor controller 130, a brake controller 140, a driving motor 150, a plurality of gears 160, and a wheel 170.

When a driver presses down the acceleration pedal 110 to drive a vehicle, a signal for an accelerator depth of the acceleration pedal 110 is transmitted to the vehicle controller 120. The vehicle controller 120 communicates with the motor controller 130 and controls an operation of a brake through the brake controller 140. The vehicle controller 120 controls the motor controller 130 to control the motor 150 by providing a torque instruction to the motor controller 130 and can fix the brake to the wheel 170 by giving an instruction to the brake controller 140. Further, the vehicle controller 120 receives motor position sensor values detected by a resolver 155 in the motor 150 through the motor controller 130.

In detail, the vehicle controller 120 can fix the wheel 170 with the wheel brake of the vehicle when the engine starts by controlling the brake controller 140. The vehicle controller 120 can apply a forward torque and a backward torque to the motor by controlling the motor controller 130 with the wheel 170 being fixed. That is, the vehicle controller 120 can control the motor controller 130 to supply a current so that the motor 150 is driven backward after driven forward by giving the instruction to the motor controller 130. For example, the forward torque may be a creep torque with a D-gear engaged, and the backward torque may be a creep torque with an R-gear engaged.

The resolver 155 in the motor 150 senses the motor position sensor values, when the motor 150 operates forward and backward and transmits them to the motor controller 130. The vehicle controller 120 can calculate the entire backlash in the driving system (motor, gears, and wheel) on the basis of the motor sensor values transmitted from the motor controller 130. In detail, the torque from the motor 150 passes through the gears before it reaches the wheel 170 through a drive shaft (not shown), in which a backlash is generated at each of the gears, and the backlash is arithmetically accumulated and causes the tip-in shock when the torque is transmitted.

The vehicle controller 120 calculates the entire backlash generated between the gears connected between the motor 150 and the wheel 170, for example, can calculate the entire backlash using a difference between the motor position sensor values when the motor operates forward and backward. The vehicle controller 120 may have a map where an interrelation of a magnitude of the calculated entire backlash, and a delay time of the driving current supplied to the driving motor is mapped. The delay time is for removing backlashes by giving an instruction for a small torque for a set period of time before the vehicle controller 120 gives an instruction for a normal torque for driving the motor 150 normally. When the delay time is relatively long, it is possible to prevent the tip-in shock by removing the backlashes, but an acceleration response may be deteriorated.

Therefore, the map in the vehicle controller 120 is mapped with the optimum delay time corresponding to the magnitude of the entire backlash between the gears 160. The optimum delay time may mean the optimum delay time during which it is possible to sufficiently remove the backlash without deteriorating the acceleration response. That is, the vehicle controller 120 can apply a torque, which is enough to remove the entire backlash for the delay time, to the motor 150 through the motor controller 130. For example, the torque enough to remove the entire backlash may be a small creep torque.

The vehicle controller 120 gives a torque reference instruction to the motor controller 130, when the vehicle travels, and the motor controller 130 can operate the motor 150 by outputting a driving current to the motor 150. In an embodiment of the present disclosure, when a condition under which a backlash is generated is satisfied with the vehicle traveling (for example, when torque is applied after regenerative braking), the vehicle controller 120 can remove the calculated backlash by controlling the motor controller 130 to apply the small creep torque to the motor 150 during the optimum delay time corresponding to the calculated entire backlash and can supply the driving current to the motor 150 by controlling the motor controller 130 after the backlash is completely removed. Accordingly, tip-in shock is not generated when the vehicle is driven with the motor 150 operated by the driving current. The motor controller 130 drives the motor 150 by supplying the current to the motor 150 in response to the instruction from the vehicle controller 120. The motor 150 is connected to the wheel 170 through the gears 160.

Figure 2:
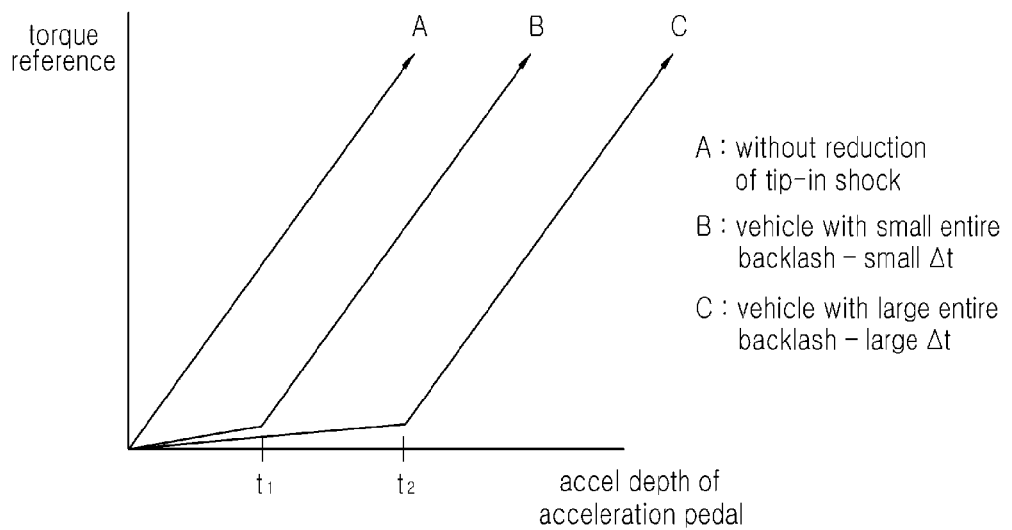
FIG. 2 is a graph illustrating a control method of reducing tip-in shock according to an embodiment of the present disclosure.

FIG. 2 is a graph showing delay time of driving current that is supplied, in a control method and system for reducing tip-in shock according to an embodiment of the present disclosure.

Referring to FIGS. 1 and 2, the vehicle controller 120 has a filter (not shown) to reduce tip-in shock due to a backlash and can remove the backlash by giving an instruction for a small torque for a delay time before giving an instruction for a normal torque under a condition causing the backlash. FIG. 2 shows the delay time until an accelerator depth of the acceleration pedal 110 and a corresponding torque reference are applied. That is, when a signal carrying a message that the acceleration pedal 110 was pressed down, or a signal relating to the accelerator depth of the acceleration pedal 110 is transmitted to the vehicle controller 120 by an adjustable positioning system (APS, not shown), the vehicle controller 120 drives the vehicle by applying the torque reference to the motor 150 through the motor controller 130. However, since the tip-in shock is generated by the backlash that may be generated between the gears 160, the motor 150, and the wheel 170, the vehicle controller 120 drives the motor 150 normally after ensuring time for removing the backlash.

Referring to FIG. 2, the control method for reducing tip-in shock according to an embodiment of the present disclosure was not applied to case A, in which the torque reference increases in proportion to the accelerator depth as soon as the acceleration pedal 110 is pressed down.

In case B, the vehicle controller 120 applies only a small torque enough to remove the backlash as the torque reference for time t1, even though the acceleration pedal 110 is pressed down. After the time t1, the accelerator depth of the acceleration pedal and the torque reference increase in proportion.

In case C, the vehicle controller 120 applies the small torque enough to remove the backlash as the torque reference for time t2, even though the acceleration pedal 110 is pressed down. After the time t2, the accelerator depth of the acceleration pedal and the torque reference increase in proportion.

The time t1 is smaller than the time t2, and the times are values set for relative comparison. It would be understood that the times may be set differently in accordance with a magnitude of the calculated entire backlash according to an embodiment of the present disclosure. That is, the delay time for removing the calculated entire backlash of which the magnitude is relatively large is longer than the delay time for removing the calculated entire backlash of which the magnitude is relatively small.

Figure 3:
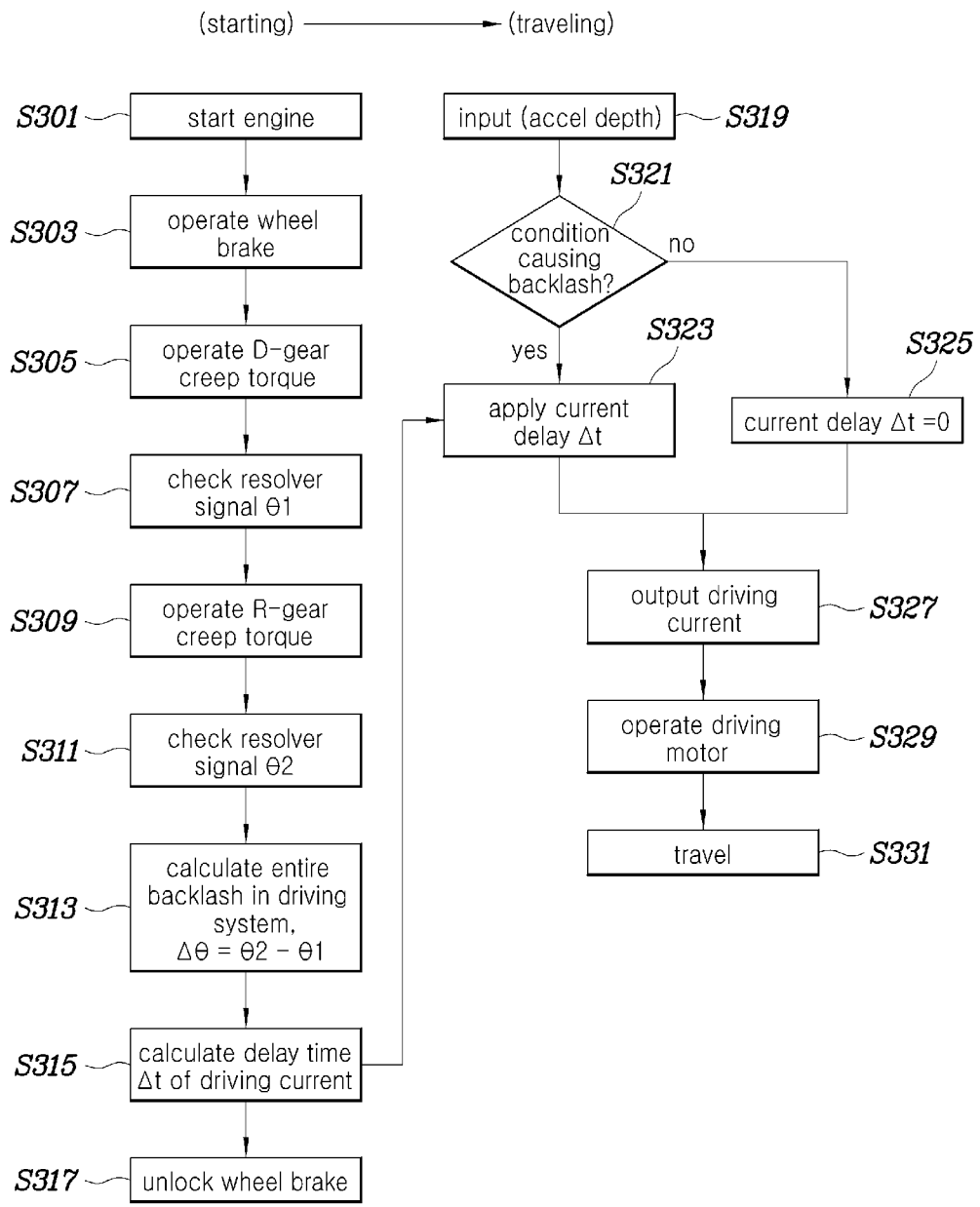
FIG. 3 is a diagram illustrating the control method for reducing tip-in shock according to an embodiment of the present disclosure.

FIG. 3 is a flowchart illustrating a control method for reducing tip-in shock according to an embodiment of the present disclosure.

Referring to FIGS. 1 and 3, after the engine starts (S301), the vehicle controller 120 operates the wheel brake (S303), and accordingly, the vehicle controller 120 operates the D-gear creep torque, that is, the forward torque with the fixed wheel 170 (S305). The vehicle controller 120 checks a resolver signal θ1 that is the motor position sensor value in this process (S307), operates the R-gear creep torque that is the backward torque (S309), and checks a resolver signal θ2 that is the motor position sensor value in this process (S311).

The vehicle controller 120 calculates the magnitude of the entire backlash in the driving system by using a difference between the found resolver signals θ1 and θ2. The vehicle controller 120 calculates the delay time of the supplied driving current corresponding to the magnitude of the backlash calculated from the map with the interrelation with the magnitude of the entire backlash (S315) and then releases the wheel 170 by unlocking the wheel brake.

Thereafter, when the acceleration pedal 110 is operated, the vehicle controller 120 receives a signal for the accelerator depth of the acceleration pedal (S319) and determines whether it is under the condition causing a backlash (S321). When it is under the condition causing the backlash, the vehicle controller 120 operates the driving motor 150 (S329) by outputting a driving current for driving the motor 150 through the motor controller 130 after the delay time (S327) and drives the vehicle by operating the driving motor 150 (S331).

Although the present disclosure has been described with reference to the exemplary embodiments illustrated in the drawings, those are only examples and may be changed and modified into other equivalent exemplary embodiments from the present disclosure by those skilled in the art. Therefore, the technical protective region of the present disclosure should be determined by the scope described in claims.

What is claimed is:

1. A control method for reducing tip-in shock, comprising steps of:
fixing a wheel with a wheel brake of a vehicle when an engine of the vehicle starts;
detecting a motor position sensor value when a motor connected to the wheel through a plurality of gears is operated forward by a forward torque and a motor position sensor value when the motor is operated backward by a backward torque, by applying the forward torque and the backward torque to the motor with the wheel being fixed;

calculating an entire backlash generated between the plurality of gears on the basis of the motor position sensor values; and applying a driving current for driving the motor to the motor in accordance with the calculated entire backlash.

2. The method of claim 1, wherein the step of calculating calculates a difference between the motor position sensor value when the motor operates forward and the motor position sensor value when the motor operates backward.

3. The method of claim 1, wherein the step of applying the driving current is performed after a delay time corresponding to a magnitude of the calculated entire backlash.

4. The method of claim 3, wherein the delay time corresponding to the magnitude of the calculated entire backlash is extracted from a map that is mapped with an interrelation.

5. The method of claim 3, further comprising a step of applying a torque to remove the calculated entire backlash to the motor for the delay time.

6. The method of claim 3, wherein the step of applying the driving current is performed after the delay time, when a backlash is generated while the vehicle travels.

7. The method of claim 1, wherein the forward torque is a D-gear creep torque and the backward torque is an R-gear creep torque.

8. A control system for reducing tip-in shock, comprising:

a motor connected to a wheel through a plurality of gears and including a resolver which senses a position;

a motor controller configured to control driving of the motor by applying a current to the motor, apply a forward torque and a backward torque to the motor, and receive a motor position sensor value when the motor is operated forward by the forward torque sensed by the resolver and a motor position sensor value when the motor is operated backward by the backward torque, from the resolver; and a vehicle controller configured to fix the wheel when an engine of a vehicle starts, receive the motor position sensor values from the motor controller, calculate an entire backlash generated between the plurality of gears on the basis of the motor position sensor values, and control the motor controller to drive the motor in accordance with the calculated entire backlash.

9. The system of claim 8, wherein the vehicle controller communicates with the motor controller and controls an operation of a brake through a brake controller.

* * * * *